United States Patent [19]
Rajnik et al.

[11] Patent Number: 5,501,842
[45] Date of Patent: Mar. 26, 1996

[54] AXIALLY ASSEMBLED ENCLOSURE FOR ELECTRICAL FLUID HEATER AND METHOD

[75] Inventors: Lawrence S. Rajnik, Corning; Paul S. Schmitt, Big Flats, both of N.Y.

[73] Assignee: Corning Incorporated, Corning, N.Y.

[21] Appl. No.: 298,337

[22] Filed: Aug. 30, 1994

[51] Int. Cl.⁶ ............................ F01N 3/28; B01D 53/36
[52] U.S. Cl. .................... 422/174; 422/177; 422/179; 422/180; 422/221; 422/222; 60/300; 219/552; 219/544; 219/205; 392/488
[58] Field of Search .................. 422/171, 177, 422/178, 179, 180, 174, 211, 221, 222; 60/299, 300; 29/890; 219/553, 543, 544, 552, 205, 542; 392/360, 488; 502/439, 527

[56] References Cited

U.S. PATENT DOCUMENTS

| | | | |
|---|---|---|---|
| 3,916,057 | 10/1975 | Hatch et al. | 422/179 |
| 3,995,143 | 11/1976 | Hervert | 219/553 |
| 4,207,661 | 6/1980 | Mase et al. | 29/890 |
| 4,347,219 | 8/1982 | Noritake et al. | 422/180 |
| 5,140,813 | 8/1992 | Whittenberger | 422/174 |
| 5,194,719 | 3/1993 | Merkel et al. | 422/174 |
| 5,250,269 | 10/1993 | Langer | 422/179 |
| 5,254,840 | 10/1993 | Thompson | 219/544 |

Primary Examiner—Robert J. Warden
Assistant Examiner—Hien Tran
Attorney, Agent, or Firm—K. van der Sterre

[57] ABSTRACT

A metal honeycomb heater is protectively mounted in an axially assembled enclosure comprising opposing tubular enclosure sections incorporating internal bore stops and a resilient mounting material to support the heater. An axial force of predetermined magnitude is applied to the sections during assembly, preloading the resilient mounting material and generating a selected spring tension and preloading force on the honeycomb. The sections are fastened together under this force so that the preloading force and spring tension are retained during subsequent use of the assembly.

3 Claims, 1 Drawing Sheet

AXIALLY ASSEMBLED ENCLOSURE FOR ELECTRICAL FLUID HEATER AND METHOD

BACKGROUND OF THE INVENTION

The present invention relates to electrically heated catalytic converter modules for automotive exhaust gas treatment applications. More particularly, the invention relates to an improved design for an assembly for such modules specially adapted for use with metallic honeycomb heaters for electrically heated catalytic converter modules.

The use of axially assembled enclosures containing ceramic honeycomb-supported catalysts for the treatment of automotive exhaust gases is known. U.S. Pat. No. 4,207,661 to Mase et al., for example, describes such an assembly comprising forward and rear case halves into which a ceramic catalytic converter substrate can be inserted. Included in the assembly are front and rear supporting members composed of a resilient material for supporting the catalytic converter substrate within the enclosure while shielding it from mechanical shocks.

Axial assembly in the manner of the above patent is advantageous in that the number of components required to securely encase the catalytic substrate within the shielding metal container is relatively small, and in that axial compression of the resilient supports for the ceramic honeycomb within the enclosure to improve the mechanical shock resistance of the assembly is more easily effected. However, one disadvantage of many of these enclosures is that the compression levels attainable are not variable, but are instead constrained by the relative dimensions of the can and honeycomb. And, as in U.S. Pat. No. 5,250,269, some designs do not utilize axial compression at all.

More complex axial constructions, such as that described in U.S. Pat. No. 4,347,219 to Noritake et al., can overcome some of these difficulties. However, the assemblies of the latter patent require a relatively large number of parts, and thus a large number of associated assembly and welding steps. Further, many of these assemblies are designed to contain relatively long honeycomb bodies and, more importantly, make no provision for gas-tight electrode feed-throughs since they are designed for catalyst substrates rather than flow-through heaters.

It has so far not been feasible to directly adapt canning assemblies for ceramic catalytic converters to the mounting of metal honeycomb heaters. Among the problems encountered in this regard is the fact that metal honeycombs for the electrical heating of exhaust gases or other fluids require electrical contacts for electrically energizing the honeycombs. These contacts typically comprise relatively heavy electrodes which pass through the walls of the metal containers used to enclose and protect the honeycombs.

Electrode pass-through structures have presented a design challenge in that they must be both gas-tight and electrically insulating, to prevent exhaust leakage as well as grounding of the electrodes to the containers.

Enclosures for electrically heated metal honeycombs for automobile exhaust use must also provide physical protection adequate to enable the heaters to meet government mandated standards for maximum allowed levels of non-methane hydrocarbons, CO, and nitrogen oxides for up to 100,000 miles of automobile use. This can involve up to 50,000 engine starting cycles and requires sustained heater integrity under severe thermal cycling, extreme temperatures, and high temperature vibration.

The problem of physical protection is aggravated by the fact that metal honeycomb designs useful for electrical heaters are somewhat lower in crushing strength and durability than their ceramic counterparts, especially at elevated engine exhaust temperatures. This places a premium on the effectiveness of the enclosure design for insulating the metal honeycomb structure from mechanical shock damage.

Finally, a number of exhaust system designs incorporating honeycomb exhaust heaters require the close mounting of a metallic or ceramic honeycomb-supported auto exhaust catalyst, called a light-off catalyst, against the heater. This is required so that electrically generated heat energy can be efficiently transferred from the metal honeycomb heater to the light-off catalyst, in order that rapid heating of the catalyst to operating or so-called light-off temperatures can be achieved.

Previous efforts to meet the various requirements for supporting heating elements in automotive exhaust systems have involved a clam-shell assembly packaging approach, wherein top and bottom half-shell enclosure sections having electrode pass-through holes or recesses have been radially compressed together over the honeycomb heater and associated insulation material. These enclosure portions are then welded together. Such enclosures have proven to be complex to assemble, and the parts are costly to fabricate. In addition, even small variations in the shape or size of the parts can result in large variations in the preloading forces under which the honeycomb heater is protected from vibration damage in the enclosure.

SUMMARY OF THE INVENTION

The present invention provides an improved honeycomb heater enclosure and enclosed heater particularly well adapted for sustained effective operation in the treatment of motor vehicle engine exhaust gases. The improved enclosure uses strong and easily formed tubular metal elements offering high inherent strength. Thus these elements can be welded together to provide a durable sealed enclosure for a metal honeycomb heating element.

The resulting heater enclosure has a design which permits convenient mating with a light-off catalyst module to provide a rugged electrically heated catalyst module as a single unit. The overlapping joints of the heater enclosure and heated catalyst module can easily be welded or otherwise sealed to insure a strong, gas-tight assembly exhibiting little or no exhaust gas leakage.

A particularly important aspect of the invention involves the use of an accurately preloaded resilient mounting material between the mounted honeycomb heater and the heater enclosure to minimize the likelihood of vibration damage to the heater in use. The axial assembly method hereinafter described permits a predetermined loading force to be applied, during the assembly procedure, to the resilient mounting material and heater on the strong axis of the heater, i.e., the heater axis parallel to the direction of the channels and channel walls of the honeycomb. This loading force is permanently maintained in the sealed assembly, with the result that optimum mechanical shock absorption by the mounting material and enclosure is insured.

In a first aspect, then, the present invention provides an improved method for mounting a channeled metal honeycomb heater in a protective enclosure. That method comprises positioning the honeycomb between first and second open-ended tubular enclosure members, each enclosure member having a bore sized to accept the honeycomb and a stop or support within the bore sized to support both the honeycomb and a resilient mounting material within the completed enclosure. Typically the stop is a permanent feature formed in or affixed to the bore to provide peripheral or edge support for the honeycomb.

The resilient mounting material is provided between the honeycomb and each of the stops, and the first and second tubular enclosure members are urged together to cause the stops to apply a predetermined preloading force to the resilient mounting material and honeycomb. Then, while maintaining the predetermined preloading force, the first and second tubular enclosure members are permanently joined by welding or the like into a unitary protective enclosure wherein the honeycomb is suspended within the enclosure by the preloaded mounting material.

The sealed enclosure or assembly of the invention is particularly well adapted for resiliently supporting a metal honeycomb heater or other device of open-ended cellular structure in a system for treating a fluid such as exhaust gas from an internal combustion engine. Describing the enclosure itself in more detail, the principal components consist of a pair of tubular metal elements within which the honeycomb is axially enclosed. The tubular elements include a first tubular metal element having a bore defining a fluid input end and a first honeycomb mounting end, the bore including within the first honeycomb mounting end a first interior support for supporting the honeycomb within the bore. This support, which can be a ledge, step, or other protrusion into the bore from the wall of the tubular element, prevents movement of a honeycomb supported thereby further into the bore toward the fluid input end of the tube.

In preferred embodiments at least a portion of the first honeycomb mounting end extends beyond or past the support to form a first honeycomb retaining lip. This lip acts to limit lateral movement of a honeycomb positioned on the first support.

The assembly further includes a second tubular metal element having a bore defining a second honeycomb mounting end and a fluid output end, that bore including within the second honeycomb mounting end a second interior support for supporting a honeycomb within the bore. Again, at least a portion of the second mounting end extends beyond the support to form a second honeycomb retaining lip for restricting lateral movement of a honeycomb supported thereon.

The honeycomb comprising the electrical heating element of the assembly is a metal honeycomb of cellular structure which is disposed between the first and second supports in the bores of the tubular elements. When so disposed, the honeycomb is aligned to permit the passage through its cellular passages of a fluid, such as an exhaust gas, which is to be treated. Treatment by the heater typically involves only heating, although heating and catalytic conversion could be simultaneously accomplished by depositing a catalyst within the cells of the metal honeycomb.

For protection of the metal honeycomb against damage from mechanical shock and vibration, a resilient mounting material is positioned between the metal honeycomb and each of the supports. Most preferably, at least some resilient material is also disposed between the honeycomb and the retaining lips adjacent the supports.

In constructing the assembly of the invention, the two tubular metal elements are brought together in telescoping fashion to form a lap joint wherein the first and second honeycomb retaining lips overlap. Thus the joint area formed by the juxtapositioning of the two elements is of double wall thickness, comprising an overlapping lip and an underlying lip. In this position, the overlying lip is situated for easy fastening to the metal forming the underlying lip, either to the lip itself or to adjoining portions of the tubular metal element forming the underlying lip.

A key characteristic of the final assembly is that the underlying lip is sufficiently short to be clear of contact with the support extending from the tubular element forming the overlapping lip, at least when a honeycomb of selected axial length is positioned between the supports. Providing a clearance between the underlying lip and the support extending from the base of the overlying lip permits the first and second supports to be brought closely enough together that they can apply an equal and opposite mounting pressure or preloading force to the resilient mounting material and metal honeycomb disposed therebetween. The level of mounting force is predetermined or preselected to provide a level of honeycomb clamping force sufficient for the intended use.

Finally, the overlapping lip of the assembly is fastened by welding or other attachment means to the metal element forming the underlying lip. This fastening maintains the relative positions of the first and second supports at that spacing initially selected to achieve the desired preloading force, thereby permanently mounting the honeycomb and resilient mounting within the enclosure under the desired supporting load.

An enclosed metal honeycomb heating element produced as above described exhibits excellent durability in the harsh environment of an internal combustion engine exhaust system. Thus sustained heating efficiency even after repeated exposure to 950° C. exhaust gas temperatures and 30 G acceleration forces can be expected. And it offers a construction readily adapted for close coupling with a companion light-off catalyst to provide effective control of start-up engine emissions during initial (cold-start) engine operation.

BRIEF DESCRIPTION OF THE DRAWINGS

The invention may be further understood by reference to the appended drawings wherein.

DETAILED DESCRIPTION

Electrical heaters useful in the practice of the invention may be of any the types which have been developed for the electrical heating of exhaust gas effluents. The preferred heaters are extruded metal honeycombs, examples of which are disclosed in U.S. Pat. Nos. 5,254,840 and 5,194,719. Alternatively, heaters comprised of sheet metal and fabricated by wrapping metal foil into channeled honeycomb configurations can be used.

Figure 1:
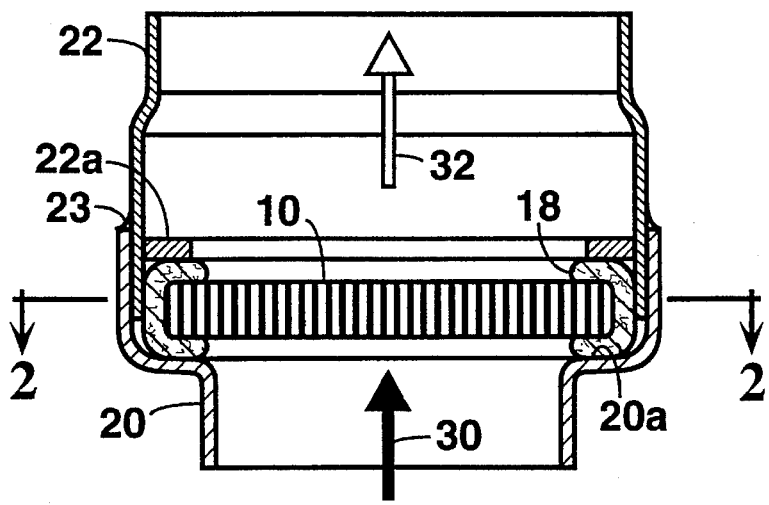
FIG. 1 is a schematic side cross-sectional view of an electrical honeycomb heater supported within an axially assembled enclosure in accordance with the invention.
Figure 2:
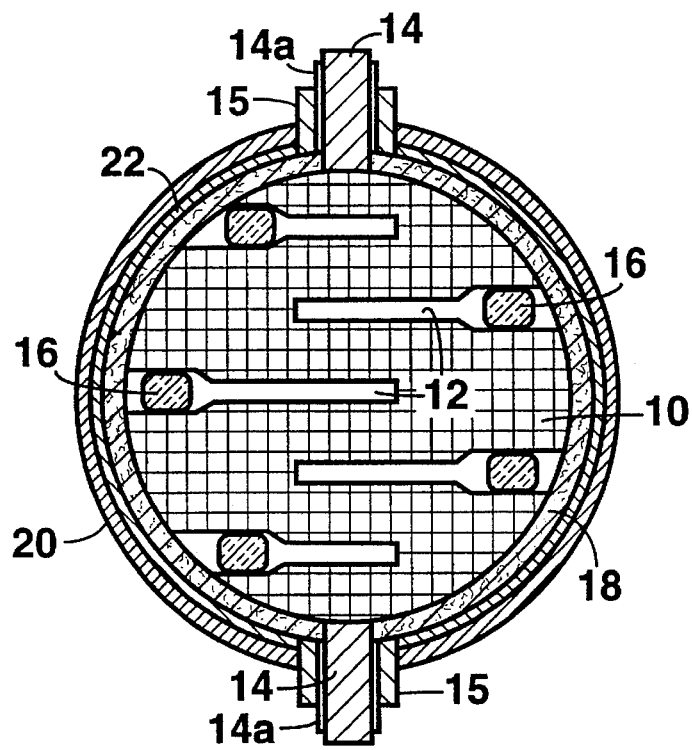
FIG. 2 is a schematic top cross-sectional view of the enclosure of FIG. 1.

In the case of extruded metal honeycomb heating elements, such as best illustrated in FIGS. 1 and 2 of the drawing, the particularly preferred configuration is a round disk 10 of extruded metal honeycomb material having the channels or cells running axially through the disk. Slots 12 are formed through the disk cross-section by removing some of the cell walls, in order to create a serpentine conductive path which increases the electrical resistance of the disk for more efficient electrical heating at typical motor vehicle battery or alternator voltages.

Powering electrodes in the form of metal studs 14 are welded to the side of the honeycomb at opposite ends of the serpentine path. These studs serve as the electrodes for connection to an electrical power source. In the embodiment shown, each stud is provided with an insulating ceramic coating 14a to electrically isolate it from bushings 15 attached to surrounding metal enclosure elements to be hereinafter described.

The slots 12 in honeycomb 10 are preferably kept separated by insulating pins 16 formed of a refractory electrically insulating material such as an alumina ceramic, the pins being retained in holes drilled into each slot from the perimeter of the honeycomb.

To electrically insulate and mechanically isolate the metal honeycomb from its surrounding enclosure, a layer of resilient insulating mounting material 18 is provided around the honeycomb. This layer, which may be formed of any electrically insulating, refractory, woven or non-woven resilient material, must be sufficiently refractory to resist deterioration at maximum exhaust system temperatures and sufficiently durable to withstand prolonged vibration and moderate to severe mechanical shocks.

The mounting material must also be sufficiently resilient to transmit a useful level of preloading force to the honeycomb heater, and to retain that force at high use temperatures. Preferred materials for the resilient mounting material are woven mat materials formed of refractory fibers, although non-woven mats or even resilient insulating foam materials, if sufficiently refractory, could alternatively be employed. With current resilient materials and honeycomb designs, preloading forces in the range of about 25–500 lbs. force, generating pressures in the 25–500 psi range on the edge portions of the honeycombs supported by the stops, are expected to provide useful levels of shock protection for the honeycombs.

Figure 3:
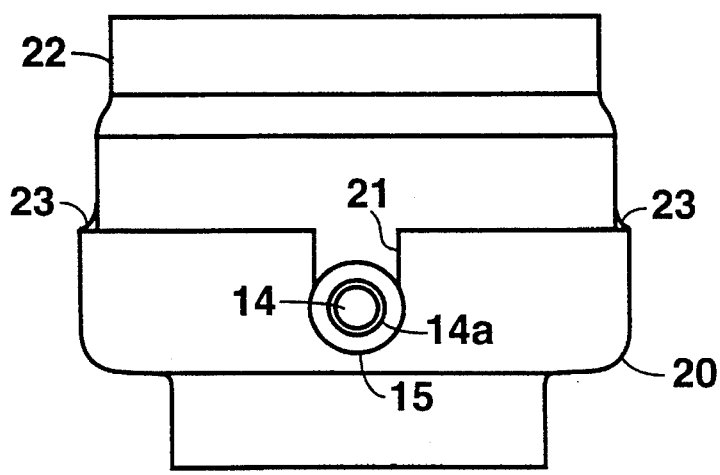
FIG. 3 is a schematic side elevational view of an assembled electrical honeycomb heater enclosure according to the invention.

In the particularly preferred embodiment of FIGS. 1–3, the enclosure is formed by tubular elements 20 and 22 which are joined together and welded at junction 23. Element 20 forms the gas inlet for the assembly, with exhaust gas entering the assembly in the direction of arrow 30 in FIG. 2, and exiting the assembly in the direction of arrow 32 after passage through honeycomb 10.

Within the honeycomb mounting end of element 20, which is the end at junction 23, the wall of element 20 forms a step or ledge 20a protruding into the bore of the element. That step provides support for honeycomb 10 and its associated mat 18. The wall portion of element 20 extending in the direction of gas flow from step 20a provides a retaining lip to restrict lateral movement of honeycomb 10 and mat 18.

Tubular element 22 forms the gas outlet end of the assembly. The honeycomb mounting end of element 22, which is that end telescoping into and joining with the mounting end of element 20, also includes interior support for the honeycomb. That support comprises ledge or ring 22a which extends from the sidewall of element 22 into the bore thereof to constrain movement of and provide support for honeycomb 10 and associated mat 18. As evident from these Figures, ledge 22a cooperates with ledge 20a of element 20 to laterally and axially hold honeycomb 10 and mat 18 firmly within the assembly of tubular elements 20 and 22.

Finally, each of elements 20 and 22 are preferably provided in the retaining lip portion with cutouts such as cutout 21 in element 20, best seen in FIG. 3. These cutouts or slots provide clearance between the elements 20 and 22 and the electrode subassemblies 14, 14a and 15 connected to the honeycomb heater 10, so that the elements 20 and 22 can be brought together to compress the resilient mounting insulation without blockage by the electrodes.

An example of the construction of an assembly such as shown in the drawings is as follows.

EXAMPLE

An extruded metal honeycomb disc for a heater element, being about 9.3 cm in diameter and 1 cm in thickness and incorporating edge slotting with insulating pins as shown in FIG. 2 of the drawing, is first provided. To opposing outer edges of the honeycomb disc are attached two opposing electrodes for electrical contact with the disc. Each electrode consists of a stainless steel stud about 8 mm in diameter which is welded to the disc for electrical contact. Each stud supports an insulating ceramic coating on its side surfaces.

A wrap of woven insulation in the form of a fibrous mat is draped around the perimeter of the honeycomb. This mat, formed of Nextel® ceramic fiber mat material commercially available from the 3M Company, Minneapolis, Minn., has insulating and electrical characteristics suitable for thermally and electrically isolating the heater from surrounding metal. The wrap includes opposing holes through which the electrode studs can protrude.

The wrapped heater element thus provided is inserted with its surrounding wrap into the end opening of a half-enclosure having the configuration of a short, open-ended cylindrical steel tube having a configuration such as shown for tubular element 22 in FIGS. 1 and 3 of the drawing. The tube, referred to as an outlet bell, incorporates a mild end flare from an terminating (gas outlet) bore diameter to a slightly larger inlet bore diameter sufficient to accept the wrapped element. When the wrapped element is inserted into the larger diameter tube bore, the tube sidewall forms a retaining lip to prevent lateral movement of the wrapped heater within the bore.

The flared end of the tube includes a pair of opposing sidewall cutouts to provide clearance between the tube wall and the protruding heater electrodes. Also provided is a steel ring positioned within the bore and welded to the inner wall of the flared end of the tube to form a protruding ledge. This ring provides a step for supporting the wrapped heater element within the tube. It is located sufficiently close to the mouth of the tube to insure that the wrapped heater when seated on the step will not be fully recessed within the tube bore but will instead protrude at least partially from the tube end.

A second half-enclosure consisting of a second short, open-ended cylindrical steel tube is next provided, having a configuration like that of tubular element 20 in FIGS. 1 and 3 of the drawing. This tube, referred to as an inlet bell, flares from an entrance or gas inlet bore to a larger bore intended to enclose the heater. The diameter of the larger bore is sufficient both to enclose the wrapped heater element and to telescope over the flared end of the first tube surrounding the element.

The flare from the smaller to the larger diameter in the second tube is sufficiently abrupt to form a circular step in the tube wall. This circular step is sized to cover approximately the same portions of the outer diameter of the wrapped heater as the ring in the bore of the first tube, so that equal opposing pressure can be exerted on both sides of the heater element as the tubes are brought together. The tube sidewall forming the larger diameter bore also includes a pair of opposing sidewall cutouts to provide clearance for the protruding heater electrodes.

Support for the wrapped heater by this second tube can alternatively be provided or supplemented by a ring affixed to the tube wall in the manner of the support ring in the first tube. Such a ring can be useful in cases where the step provided by the flare in the tube wall is not wide enough to provide the desired level of heater support, or where the honeycomb heater body is sufficiently thin that the desired preloading force on the insulation cannot be achieved due to interference between the a heater electrode and a sidewall cutout, or between a stop and a honeycomb retaining lip.

To complete the assembly of the heater enclosure the two tubes are brought together until the end portion of the sidewall of the inlet bell telescopes over and at least partially overlaps the end portion of the sidewall of the outlet bell, and until the circular step in the bore of the inlet bell comes into contact with the wrapped heater element protruding from the bore of the outlet bell. The sidewall cutouts of both tubes are aligned with the electrodes during this step to assure electrode clearance from the sidewalls of the tubes.

To obtain adequate preloading of the insulation encasing the wrapped heater element, the inlet and outlet bells are urged together under a force of approximately 200 pounds. When compressed in this way fibrous insulation of this type acts as a mechanical spring, having a both a measurable spring rate and some level of internal damping.

In the present case, at a preloading level of 200 pounds, the instantaneous spring rate of the insulation is 9,200 pounds per inch. This rate is adequate to effectively suspend the heater element within the metal enclosure to provide effective protection from vibration damage. Of course, the preloading force may be varied as needed to optimize the protection afforded the heater by the particular insulation selected, in light of the conditions of use for the heater which are anticipated.

While maintaining this preloading force level on the enclosed heater element the enclosure halves are spot welded together to permanently set the preloading level on the heater element. FIG. 3 of the drawing shows the assembly at this stage of the process, wherein the tubes have been joined together to contain the heater element, for example by spot welds at junction 23, but not sealed.

After the elements have been preliminarily joined, the joint between the overlapping sidewalls of the two tubes is seam welded to form a strong lap joint between the tubes. Finally, steel bushings placed over each of the electrodes and against the overlapping sidewalls are welded to the walls. These welding steps are carried out to achieve substantially gas-tight closure of the lap joint and electrode cutouts.

Inasmuch as the welding process affects the temperature and thus the dimensions of the tubes the preloading level can fluctuate during and at the end of the welding process. However, the effects of these fluctuations are predictable and can readily be compensated for in selecting the preloading levels to be initially applied.

Durability testing of the heater contained within the enclosure as above described is carried out under environmental conditions designed to approximate those encountered in an automotive exhaust environment. The test used, denominated a hot vibration test, involves hot vibration of the welded unit at 950° C. under 100 hertz, 30 G acceleration. These are conditions which cause repeated flexing of the heater element at temperatures where the element is most susceptible to damage from fatigue.

Depending in part on the particular design of the extruded metal honeycomb used to provide the heating element in assemblies such as above described, such elements can withstand more than 100 hours of exposure to the hot vibration test without damage to the electrical integrity of the heater element or enclosure.

A particular advantage of the axial canning method of the present invention is the degree of control over the cushioning of the heating element which can be achieved. The honeycomb heater acts as a suspended mass when the heater container is subjected to harsh vibration. When compressed properly, the resilient insulation serves as a mechanical suspension to dampen the honeycomb from harsh mechanical disturbances. The use of preloaded axial canning of the heater in accordance with the invention permits much greater control over the spring rate of the preloaded the insulation, and thereby greater control over the mechanical response of the honeycomb to the hot, mechanically severe environment of an automotive exhaust system.

We claim:

1. A fluid treating assembly comprising a metal honeycomb of open cellular structure resiliently mounted in an open-ended metal enclosure, said enclosure comprising:

a first tubular metal element having a first bore defining a fluid input end and a first honeycomb mounting end, the first bore including within the first honeycomb mounting end a first interior support for supporting the honeycomb within the first bore, at least a portion of the first mounting end extending past the first interior support to form a first honeycomb retaining lip;

a second tubular metal element having a second bore defining a second honeycomb mounting end and a fluid output end, the second bore defining the second honeycomb mounting end including a second interior support for supporting the honeycomb within the second bore, at least a portion of the second mounting end extending past the second interior support to form a second honeycomb retaining lip;

the metal honeycomb of cellular structure being disposed between the first and second interior supports and aligned to permit the passage through the structure of a fluid to be treated; and a resilient mounting material positioned between the metal honeycomb and each of the interior supports; wherein
   (i) the first and second honeycomb retaining lips are telescoped together to form said enclosure such that one lip overlaps the other to form an overlapping lip and an underlying lip;
   (ii) the underlying lip is clear of contact with the support extending from the overlapping lip;
   (iii) each of the first and second honeycomb retaining lips is provided with at least one recess; the first and second interior supports being spaced to apply equal and opposite mounting pressure to the resilient mounting material and the metal honeycomb;
   (iv) the tubular metal elements are fastened together to maintain the spacing of the first and second interior supports;
   (v) the metal honeycomb is provided with at least one electrode; and
   (vi) the recess in the overlapping lip is aligned with the recess in the underlying lip to form an opening in the enclosure from which the electrode extends.

2. An assembly in accordance with claim 1 wherein the overlapping lip is fastened to the underlying lip or to a portion of the tubular element extending from the underlying lip.

3. An assembly in accordance with claim 2 wherein the overlapping lip is fastened to the underlying lip by welding.

* * * * *